Oct. 4, 1932.   W. A. TRYON   1,880,301
BEARING LUBRICATING MEANS
Filed Oct. 8, 1930
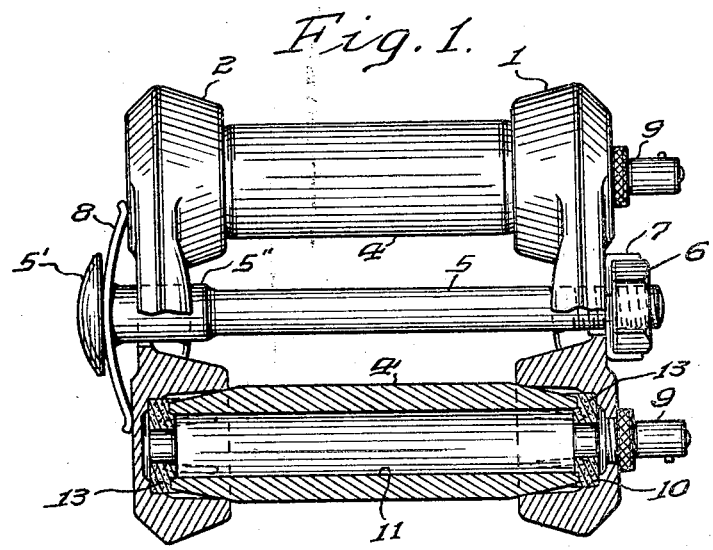
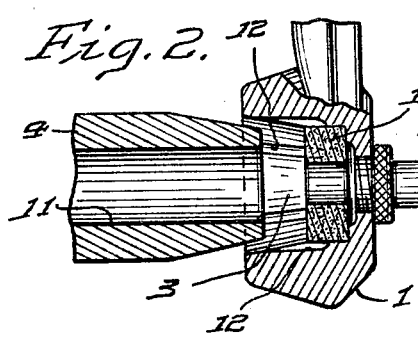
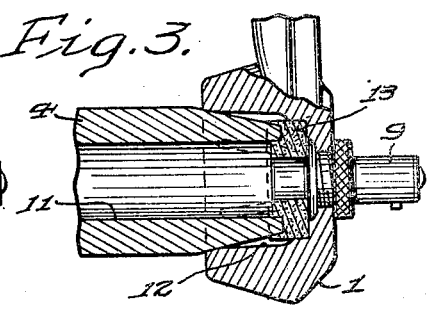
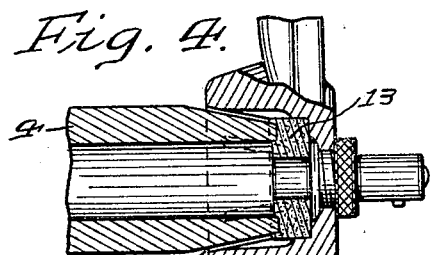
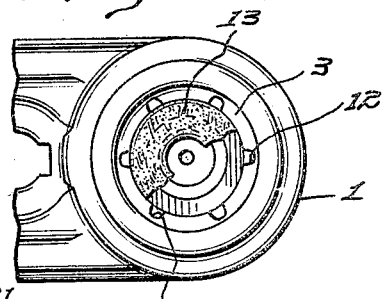
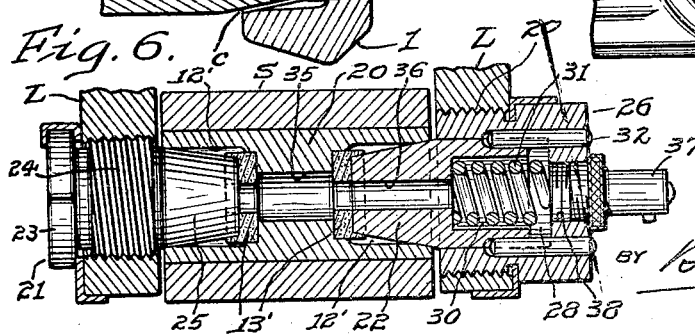
INVENTOR
William A. Tryon
ATTORNEYS Patented Oct. 4, 1932

1,880,301

UNITED STATES PATENT OFFICE

WILLIAM A. TRYON, OF ELMIRA, NEW YORK, ASSIGNOR TO PATENT PURCHASING COMPANY, OF ELMIRA, NEW YORK, A CORPORATION OF RHODE ISLAND

BEARING LUBRICATING MEANS

Application filed October 8, 1930. Serial No. 487,098.

While my invention is capable of application to numerous forms of bearings it is particularly adapted for use in connection with those forms of automobile spring shackles which embody transversely extending pins having conical ends seating in correspondingly conical apertures or pockets in the side links which are constantly urged toward each other and thus normally maintained in bearing engagement with the pins by suitable resilient means preferably associated with a single bolt arranged to hold the side links in assembled position on the pins, a shackle of this general type forming the subject of United States Letters Patent 1,534,193, granted to me April 21, 1925 or with wear compensating bearing of the types forming the subject fo United States Letters Patent 1,712,310 granted May 7, 1929 to Charles H. Sayre and I shall therefore herein refer more especially to the use of the invention in shackles or bearings of the character stated.

A principal object of the present invention is the provision of improved means for effectively lubricating the cooperative bearing surfaces of the pins and side links of the shackle or of the cones and bushing comprised in the said wear compensating bearing and, more specifically, the provision of novel means for automatically supplying oil to said surfaces, more especially when the automobile of which the shackle or bearing forms a component element is moving, with consequent prolongation of the effective life of the parts.

A further object of the invention is the provision of means of the character aforesaid which, although simple in character, are eminently satisfactory for the performance of their intended function; which do not materially increase the cost of production of the shackle or bearing and which are effective for long periods of time so that renewal thereof need only be effected at relatively long intervals and then at a substantially negligible expense.

Other objects, advantages and novel features of construction and arrangement comprehended by the invention are hereinafter more particularly pointed out or will be apparent to those skilled in the art from the following description, reference being had to the accompanying drawing.

In said drawing, Fig. 1 is a side view partially in elevation and partially broken away into central section of a well known form of shackle embodying my improved lubricating means; Fig. 2 is an enlarged fragmentary view substantially in central section showing an end of one of the side links of the shackle and adjacent parts as well as an end of one of the pins as it is being inserted in the pocket in the side link during the process of assembly; Fig. 3 is a view generally similar to Fig. 2 but showing the pin in assembled position in the side link with the parts in the positions they would occupy when the automobile is at rest. Fig. 4, generally corresponding to Figs. 2 and 3 insofar as it illustrates the same parts, is designed to show the action under operative conditions of the lubricating means with which the shackle is provided, as hereinafter more fully explained, while Fig. 5 is a fragmentary view on the same scale as Figs. 2, 3 and 4 of an end of one of the side links as it appears when looking into the pin-receiving pocket with the pin removed, the resilient pad or washer hereinafter referred to being partially broken away to more clearly show the parts lying beneath it. In Fig. 6 I have shown a wear compensating bearing of the type disclosed in said Patent 1,712,310 with the improved lubricating means of my invention applied thereto, the figure being a central section through the bearing. Throughout the drawing the same characters of reference are used to denote the same parts in the several figures.

While the present invention may be utilized in shackles and bearings varying materially in their structural details, I have shown it in Figs. 1 to 5 of the drawing as applied to a commercial shackle comprising oppositely disposed side links 1 and 2 respectively provided near their extremities with generally conical pockets 3 adapted for the reception of the correspondingly tapered or conical ends of transversely extending hollow pins 4 which, when the shackle is assembled in the automobile, are respectively firmly and nonrotatably seated in the spring eye and in the spring hanger or other equivalent part attached to the frame of the automobile. The side links of the shackle are maintained in assembled relation on the pins through the medium of a transversely extending bolt 5 which passes through openings in the centers of the side links and is retained in position by a nut 6 which is prevented from backing off the end of the bolt by a lock washer 7. At its opposite end, the bolt is provided with a head 5' beneath which and bearing on the outer face of the adjacent link 2 is an outwardly bowed spring plate 8 continuously maintained under suitable compression and thus effective to draw both side links toward each other and maintain substantially constant bearing engagement between the conical ends of the pins and the correspondingly coned or tapered surfaces of the pockets. To prevent the bolt 5 from turning axially, it is desirably made elliptical in cross section adjacent the head as at 5" and the hole formed for its passage through the adjacent link made correspondingly elliptical. Thus, when the shackle is assembled in the automobile to form a connecting element between the spring and frame thereof, there is a substantially constant relative oscillatory movement between the pins 4 and the side links of the shackle when the automobile is in motion which, in the absence of adequate lubrication of the conical bearing surfaces of the pins and of the side links, would result in excessive wear therebetween.

Hitherto, for effecting the requisite lubrication of these surfaces, it has been customary to provide one of the side links with nipples 9 communicating at their inner ends with clearance spaces 10 between the bottoms of the pockets in the link and the ends of the adjacent hollow pins so that grease or heavy oil can be forced under pressure by means of a suitable gun or the like into the chambers or reservoirs 11 formed within the pins; thereafter this lubricant gradually works out into annularly spaced oil grooves 12 formed in the bearing surfaces of the packet and communicating with said clearance spaces and then from the oil grooves between the bearing surfaces of the pins and of the pockets.

While this method of lubrication is reasonably satisfactory under most conditions to prevent undue wear between the bearing surfaces, I have found that much more adequate lubrication thereof can be effected and the life of the shackle correspondingly prolonged by means of the present invention which, speaking generally, consists in disposing in each clearance space 10, the walls of which are desirably parallel to the axis of the pocket instead of inclined thereto so as to permit the end of the pin to project a little beyond the inclined bearing surface of the pocket and thus prevent the formation of a shoulder in the latter as the parts gradually wear together, a pad 13, desirably in the form of an annular ring or washer, of felt or other like fibrous resilient material of highly capillary capacity. This pad is initially somewhat thicker than the depth of the clearance space 10, so that when disposed therein prior to the insertion of the pin in the adjacent pocket the pad, as shown in Fig. 2, projects somewhat beyond the shoulder formed at the juncture of the straight wall of the clearance space and the inclined bearing surface of the pocket. When the pins are assembled in the shackle, however, and the side links yieldingly drawn together by the action of the spring 8 so as to bring the bearing surfaces of the pin and of the pocket into mutual engagement, the extremities of the pins materially compress the pads endwise substantially as shown in Fig. 3, the parts remaining in this position when the automobile is at rest.

If a medium viscosity oil be now injected through the nipples 9 into the reservoirs 11, the holes at the centers of the pads 13 facilitating its passage into the reservoirs, a certain amount thereof will be at once taken up by the pads until they become substantially saturated although under a state of considerable endwise compression between the bottoms of the pockets and the ends of the pins. Thereafter when the automobile is set in motion, the inequalities of the road surface and other like conditions produces, in addition to the relative oscillatory movement between the links and the pins resulting from the flexing of the spring in a vertical plane, a certain though very slight amount of end play between the side links and the pins which tends to intermittently separate the bearing surfaces thereof very slightly as indicated in Fig. 4 in which, however, the extent of separation or clearance c is greatly exaggerated for purposes of illustration. This intermittent endwise separation results in correspondingly intermittently relieving the endwise pressure on the pads, at least to some extent, thus momentarily increasing their ability to absorb more oil from the adjacent reservoirs, but as the bearing surfaces return to normal or engaging position, the endwise pressure on the pads is again increased with the result that a certain amount of excess oil which they have absorbed is forced radially outward into the annularly spaced oil grooves 12 in the conical bearing surface of the pocket and from thence works out between the adjacent parts of the said bearing surface and that of the adjacent pin and forms an adequate oil film therebetween. In short, the resilient pads 13 act in a manner somewhat similar to small pumps, taking oil from the reservoirs when the normal endwise pressure on the pads is relieved as the automobile twists and rolls in its passage over the ground and discharging the same into the oil grooves 12 when said pressure is restored, whereby the oil is delivered substantially as positively to those oil grooves located above the axis of each pin as to those located below it with corresponding adequate and substantially even lubrication of the entire area of the coacting bearing surfaces of the pins and links.

It is probably largely due to the even distribution of the oil thus brought about that by means of the present invention the life of the coacting bearing surfaces is materially prolonged, a fact which has been unequivocally demonstrated by numerous tests under actual operating conditions, for it is obvious that in shackles as heretofore constructed the lubricant, whether oil or grease, injected into the reservoirs 11, cannot reach those oprtions of the bearing surfaces lying above the axes of the pins as readily as those lying below said axes, particularly as the amount of lubricant contained in the reservoirs gradually decreases, so that while certain portions of the coacting bearing surfaces may be lubricated more or less adequately so long as any lubricant remains in the reservoirs, other portions thereof, especially those lying above said axes, receive less and less lubricant as the amount contained in the reservoirs gradually diminshes, with the result that appreciable wear takes place after some thousands of miles of use. On the other hand, the lubrication in shackles embodying my invention is adequate and substantially constant throughout the entire area of the coacting bearing surfaces so long as any oil remains in the reservoirs, and shackles equipped therewith have evidenced no appreciable wear between said said surfaces after fifty thousand or more miles of use. The invention, therefore, materially contributes to the life of the shackle and consequent reduction of the upkeep expense of the automobile in which it is embodied, and I therefore regard it is a distinct and meritorious advance in the art.

In Fig. 6 I have shown the invention as applied to a wear compensating bearing of the general type disclosed in said Patent 1,712,310, this figure illustrating the bearing as forming an operative connection between laterally spaced depending lugs L—L forming integral parts of the frame of an automobile and the eye of a spring S disposed therebetween; in this eye is disposed a bushing 20 pressed or otherwise seated therein so as to be operatively rigid therewith. This bushing is axially bored and provided adjacent its ends with outwardly and oppositely tapered bearing surfaces adapted to bear upon the bearing surfaces or regions of the spindle 21 and sliding bushing 22 when the parts are operatively assembled. The spindle 21 progressively comprises a head 23 adapted to rest against the outer face of one of the lugs L, an exteriorly threaded region 24 adapted to seat in a correspondingly internaly threaded bore in the lug, and a conical region 25 tapering inwardly from the threaded region in correspondence with the adjacent tapered bearing surface of the bushing 20 in which, when the parts are assembled, the conical portion is received and thus serves to support the adjacent end of the bushing. At the opposite end of the latter, support is afforded thereto through a sleeve nut, generally designated as 26, having a head adapted to seat against the outer face of the other lug L and an exteriorly threaded portion 27 adapted to be screwed into a correspondingly internally threaded bore in the lug. The nut is axialy bored out to provide a cylindrical cavity 28 for the reception of the outer cylindrical end of the sliding bushing 22 which forms a sliding fit therein and whose inner end is conical and inwardly tapered in correspondence with the tapered bore in the adjacent end of the bushing 20. The outer end of the sliding bushing is also axially bored to form a cavity 30 in which is disposed a coil spring 31 which, after the parts are assembled, is constantly maintained in a state of compression between the ends of the bores or cavities in the nut and in the sliding bushing and is thus effective to continuously urge the latter inwardly into the spring eye bushing 20. For preventing rotation of the sliding bushing, any suitable means are provided such as diametrically spaced pins 32 driven, after the parts are assembled, into holes drilled inwardly from the outer face of the nut and at their inner ends partially extending into the sliding bushing.

Between the conically tapered bearing surfaces of the bushing 20, the latter may be bored axially to form an oil receiving chamber 35, while the sliding bushing may be axially bored from the cavity 30 to its inner end to provide a passage 36 through which lubricant can enter the reservoir from a lubricating nipple 37 carried by the nut 26, the latter being provided with a passage 38 from the inner end of the nipple to the outer end of the bore 28, so that after injection through the nipple the lubricant, desirably a medium viscosity oil, can pass through the cavities in the nut and sliding bushing and thence through passage 36 into the reservoir 35.

The inner end of the conical bores in the bushing 20 are chamfered to form straight walled recesses of slightly greater diameter than the inner ends of the conical portions of the sliding bushing and spindle, substantially as described in connection with the shackle illustrated in the preceding figures and for the same purpose, and in these recesses are respectively disposed the resilient pads 13' desirably in the form of annular rings or washers. As hitherto explained, these washers are of such thickness that when the parts are assembled they will normally be compressed by the respectively adjacent ends of the sliding bushing and of the spindle, which compression, however, will be alternately slightly relieved and renewed when the automobile of which the bearing forms a component part is in motion, particularly over a rough road, so that the washers are alternately compressed and expanded and oil alternately "pumped" by them from the adjacent oil reservoir and forced into the oil grooves 12' with which, as shown, the conical bearing surfaces of the bushing 20 are provided, the operation being similar to that hereinbefore described in greater detail in connection with the preceding figures in the drawing.

While I have shown in the drawing the oil grooves 12 and 12' as disposed in the conical bearing surfaces of the side links of the shackle and of the bushing 20 respectively, it is merely a matter of choice whether the said grooves are formed therein or in the tapered bearing surfaces of the pins in the case of the shackle, or of the spindle and sliding bushing in the case of the bearing. It will further be understood that the wear compensating bearing shown in Fig. 6 exemplifies only one of many forms of such bearings with which the invention may be desirably employed, for irrespective of the specific details of construction thereof, and which are capable of wide variation, the utilization of my invention in bearings of this general class materially contributes to and prolongs the life of the coacting bearing surfaces by insuring their adequate and proper lubrication as long as lubricant is supplied from time to time to the reservoir adjacent the resilient pads.

While I have herein described and illustrated a preferred form of my invention embodied in a shackle and in a wear compensating bearing of well known type, I do not thereby desire or intend to confine or limit the use of the invention thereto, as it may be employed with equal facility and benefit in shackles and bearings of other forms than those to which I have chosen to refer, nor do I restrict myself to the use of washers or pads of any particular material, as the same may be formed of any suitable material other than felt if preferred, nor to any precise details of form, construction or arrangement of the washers and associated parts, as the same are capable of and may be modified in various particulars without departing from the spirit and scope of my invention as defined in the appended claims.

Having thus described my invention, I claim and desire to protect by Letters Patent of the United States:

1. The combination with a shackle comprising opposed side links and hollow conical ended pins extending therebetween, said links having conical bearing pockets adapted to receive the ends of the pins, yieldable means operative to maintain the links in assembled relation on the pins, and means for introducing oil to the interior thereof, of resilient means disposed between the ends of the pins and the bottoms of the pockets operative to alternately absorb oil from the interior of the pins and to discharge it adjacent the coacting bearing surfaces of the pins and of the pockets upon the occurrence of relative endwise movement between the side links and the pins.

2. The combination with a shackle comprising side links having conical bearing pockets adjacent their extremities, hollow transversely extending pins projecting into said pockets and forming oil reservoirs, and means for yieldingly maintaining normal bearing engagement between the walls of the pockets and the pins, of a resilient pad disposed between the end of each pin and the bottom of the adjacent pocket and normally compressed endwise by the pin but operative on relief of such compression to absorb oil from the interior of the pin and to discharge it adjacent the coacting bearing surfaces of the pin and of the pocket upon renewal of said compression.

3. The combination with a shackle comprising side links having conical bearing pockets in their ends, transversely extending hollow pins having conical ends projecting into said pockets, and yielding means operative to normally maintain bearing engagement between the pins and the walls of the pockets, one of the mutually engaged surfaces being provided with a plurality of annularly spaced oil grooves, of an annular felt pad disposed in the bottom of each pocket and normally under endwise compression by the pin, said pad being adapted to absorb oil from the interior of the pin when said endwise pressure is momentarily relieved and to discharge said oil into the adjacent oil grooves for transmission to said coacting bearing surfaces upon renewal of said pressure.

4. In a shackle comprising opposed side links having conical bearing pockets in their ends, transversely extending hollow pins having conical ends seating in said pockets, and means for yieldingly normally maintaining bearing engagement between the pins and the pocket walls, a pad of fibrous material disposed in the bottom of each pocket and normally under endwise compression between the bottom of the pocket and the end of the adjacent pin.

5. The combination with a shackle comprising opposed side links having conical bearing pockets in their ends, transversely extending pins having conical end bearing surfaces projecting into and seating in said pockets, and means for yieldingly holding the side links on the ends of the pins, one of the mutually engaging surfaces having annularly spaced oil grooves of a felt pad disposed in the bottom of each pocket adjacent the inner ends of said grooves and normally under endwise compression between the end of the adjacent pin and the bottom of the pocket, said pad being adapted to absorb oil from the interior of the pin when the endwise pressure on the pad is relieved, and to thereafter discharge a portion of said oil into said oil grooves upon renewal of said pressure.

6. In a bearing comprising elements having coacting conical bearing surfaces and yielding means operative to normally maintain bearing engagement between said surfaces, one of said elements comprising a chamber forming an oil reservoir, a pad of resilient material disposed adjacent an end of said reservoir, normally engaged by both elements and operative to absorb oil from said reservoir upon the occurrence of movement between said elements of a character tending to separate their bearing surfaces and to discharge it adjacent said surfaces upon movement therebetween in the opposite direction.

7. The combination with a bearing comprising two members having conical coacting bearing surfaces, one of said members comprising a chamber forming an oil reservoir, and resilient means operative to normally maintain said bearing surfaces in bearing engagement, of a pad of resilient material disposed in one element adjacent one end of said chamber and normally under compression by the other element operative on the release of such compression to absorb oil from said chamber and to discharge it adjacent the coacting bearing surfaces of the two elements upon renewal of said compression.

In witness whereof I have hereunto set my hand this 7th day of October, 1930.

WILLIAM A. TRYON.